(12) United States Patent
Ozaki

(10) Patent No.: US 9,007,629 B2
(45) Date of Patent: Apr. 14, 2015

(54) INFORMATION PROCESSING APPARATUS, METHOD FOR CONTROLLING INFORMATION PROCESSING APPARATUS, AND COMPUTER PROGRAM

(75) Inventor: Hiroshi Ozaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 13/545,636

(22) Filed: Jul. 10, 2012

(65) Prior Publication Data

US 2013/0021647 A1   Jan. 24, 2013

(30) Foreign Application Priority Data

Jul. 21, 2011 (JP) ................. 2011-159467

(51) Int. Cl.
  *G06F 3/12* (2006.01)
  *H04L 29/06* (2006.01)
  *G06F 15/16* (2006.01)

(52) U.S. Cl.
  CPC ............ *H04L 63/083* (2013.01); *G06F 3/1204* (2013.01); *G06F 3/1225* (2013.01); *G06F 3/1288* (2013.01)

(58) Field of Classification Search
  CPC ... G06F 3/1293; G06F 3/1285; G06F 3/1288; G06F 3/1225; G06F 3/1204
  USPC ......... 358/1.11–1.18, 1.1, 1.9, 400–404, 501; 711/163, 164; 715/736–741; 709/203, 709/213–219; 726/7
  See application file for complete search history.

(56) References Cited

U.S. PATENT DOCUMENTS

| | | | |
|---|---|---|---|
| 6,829,059 B1 * | 12/2004 | Kimura | 358/1.15 |
| 2002/0078160 A1 * | 6/2002 | Kemp et al. | 709/208 |
| 2003/0233488 A1 * | 12/2003 | Ozaki et al. | 709/321 |
| 2004/0054962 A1 * | 3/2004 | Shima et al. | 715/500 |
| 2004/0172586 A1 * | 9/2004 | Ragnet et al. | 715/500 |
| 2004/0212821 A1 * | 10/2004 | Kimura | 358/1.14 |
| 2005/0138065 A1 * | 6/2005 | Ciriza | 707/104.1 |
| 2012/0140285 A1 * | 6/2012 | Kamath et al. | 358/1.15 |

FOREIGN PATENT DOCUMENTS

JP   2010-271988 A   12/2010

* cited by examiner

*Primary Examiner* — Chad Dickerson

(74) *Attorney, Agent, or Firm* — Canon USA, Inc., IP Division

(57) ABSTRACT

An information processing apparatus receives distribution of information of a server device which manages an image output device as an input destination of a print job, and automatically registers the server device as an output destination of a printing instruction. A computer device, which issues a printing instruction via a network to cause an image output device to execute a print job, makes an acquisition request of device management information to be updated, to a computer management device which manages the device management information including information regarding an output destination of the printing instruction issued by the computer device, and acquires the device management information to be updated. The computer device registers a cloud service server device as the output destination of the printing instruction based on information regarding the cloud service server device included in the device management information to be updated.

15 Claims, 12 Drawing Sheets

FIG.9A

PORT TYPE: Cloud
NAME: CLOUD A
FUNCTION NAME: DATA STORAGE
ID/PASSWORD AUTHENTICATION: ON
TRANSFER METHOD: FTP
ADDRESS: ABC.CO.JP/FTP

FIG.9B

PORT TYPE: Cloud
NAME: CLOUD B
FUNCTION NAME: BOOKBINDING
                FINISHING
ID/PASSWORD AUTHENTICATION: OFF
TRANSFER METHOD: FTP
ADDRESS: DEF.CO.JP/FTP

FIG.9C

PORT TYPE: Cloud
NAME: CLOUD C
FUNCTION NAME: PRINT SERVICE
ID/PASSWORD AUTHENTICATION: ON
TRANSFER METHOD: IPP
ADDRESS: GHI.CO.JP/IPP

FIG.9D

PROPERTY OF ABC SERIES PRINTER

| OVERALL | SHARE | PORT | ADVANCED SETTING | MANAGEMENT OF COLOR | SECURITY | DEVICE SETTING | FAVORITE |

ABC series Printer

PRINTING PORT (P)
DOCUMENT IS PRINTED BY FIRST AVAILABLE PORT AMONG PORTS IN WHICH CHECK BOX IS ON.

| PORT | DESCRIPTION | PRINTER |
|---|---|---|
| ☐ COM3: | SERIAL PORT | |
| ☐ COM4: | SERIAL PORT | |
| ☐ FILE: | OUTPUT TO FILE | |
| ☑ 111.222.333.444 | STANDARD TCP/IP PORT | ABC series Printer |
| ☐ CLOUD A: | CLOUD PORT | |
| ☐ CLOUD B: | CLOUD PORT | |

[ ADDITION OF PORT (T)... ]  [ DELETION OF PORT (D)... ]  [ CONFIGURATION OF PORT (C)... ]

☑ VALIDATE BI-DIRECTIONAL SUPPORT (E)
☐ VALIDATE PRINTER POOL (N)

[ OK ]  [ CANCEL ]  [ APPLICATION (A) ]  [ HELP ]

FIG.11

| SETTING OF ACCOUNT INFORMATION | ✕ |

ACCOUNT NAME (U):
LOGIN NAME          (UP TO 32 ONE-BYTE CHARACTERS
                    (16 TWO-BYTE CHARACTERS))

PASSWORD (P):
                    (0~9999999)

[ OK ]  [ CANCEL ]  [ HELP (H) ]

INFORMATION PROCESSING APPARATUS, METHOD FOR CONTROLLING INFORMATION PROCESSING APPARATUS, AND COMPUTER PROGRAM

BACKGROUND OF THE INVENTION

1. Field of the Invention

The present invention relates to an information processing apparatus, a method for controlling an information processing apparatus, and a computer program.

2. Description of the Related Art

When a computer device outputs a printing instruction to an image output device connected to a network, the computer device installs a printer driver suitable for the image output device, and sets a port to which the image output device is connected, as an output port. When the output port is set, a user can output the printing instruction to the image output device from the printer driver installed in the computer device. Thus, the computer device can input a print job included in the printing instruction to the image output device.

Cloud services may include a printing system in which a printer driver of a client device issues a printing instruction to a cloud service server device on a cloud, and the cloud service server device generates image data according to the printing instruction. In such a printing system, the cloud service server device inputs a print job corresponding to the generated image data to the assigned image output device, and causes the image output device to execute the print job. The image output device may access the cloud service server device to acquire the image data from the cloud service server device, generate the print job, and output printing.

Japanese Laid-Open Patent Application No. 2010-271988 discusses a data processing apparatus configured to select an output destination printer via a network. The data processing apparatus manages an output request source identification value and an output destination by associating the output request source identification value and the output destination with each other, and selects the output destination according to the managed information.

When the printer driver of the client device outputs the printing instruction to the cloud service server device, an issue may occur. When the output destination of the printing instruction is the image output device, the client device searches for the image output device provided on the network on which the client device is provided, and thus the output destination can be automatically set.

However, since the client device is provided on a local network different from the cloud on which the cloud service server device is provided, the client device cannot search for and/or specify the cloud service server device. Therefore, a user of the client device needs to acquire connection destination information of the cloud service server device by himself/herself and manually register the connection destination information. When a manufacturer of the image output device or the like starts a new cloud service, it is difficult to publicize the start of the new cloud service for users.

In order to solve such an issue, information about the server device (cloud service server device) which manages the image output device as a input destination of a print job needs to be distributed to the client device, and the client device needs to automatically register the server device as the output destination of the printing instruction. However, an information processing apparatus has not been discussed, which receives distribution of information about a server device which manages an image output device as a input destination of a print job, and automatically registers the server device as an output destination of a printing instruction.

SUMMARY OF THE INVENTION

The present invention is directed to an information processing apparatus configured to receive distribution of information of a server device which manages an image output device as an input destination of a print job, and to automatically register the server device as an output destination of a printing instruction.

According to an aspect of the present invention, an information processing apparatus configured to issue a printing instruction via a network to cause an image output device to execute a print job, includes a request unit configured to make an acquisition request of device management information to be updated corresponding to the information processing apparatus, to a management device configured to manage the device management information including at least information regarding an output destination of the printing instruction issued by the information processing apparatus, an information acquisition unit configured to acquire the device management information to be updated from the management device according to the acquisition request, a determination unit configured to determine whether the device management information to be updated includes information regarding a server device configured to generate a print job according to the printing instruction from the information processing apparatus to input the print job to the image output device, and an output destination registration unit configured to register the server device as the output destination of the printing instruction based on the information regarding the server device if the device management information to be updated is determined to include the information regarding the server device.

The information processing apparatus according to the present invention can receive the distribution of the information of the server device, which manages the image output device as the input destination of the print job, and automatically register the server device as the output destination of the printing instruction. Therefore, for example, the management device, which manages cloud service information, can distribute the cloud service information to the information processing apparatus according to the request from the information processing apparatus, and a port monitor of the information processing apparatus can register the output destination of the printing instruction based on the cloud service information. In addition, when the server device that can be utilized by the information processing apparatus is changed, the changed server device can be automatically registered as the output destination.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 9A to 9D illustrate examples of cloud service information and a port monitor registration state screen.

FIG. 11 illustrates an example setting screen for account information.

DESCRIPTION OF THE EMBODIMENTS

Various exemplary embodiments, features, and aspects of the invention will be described in detail below with reference to the drawings.

Figure 1:
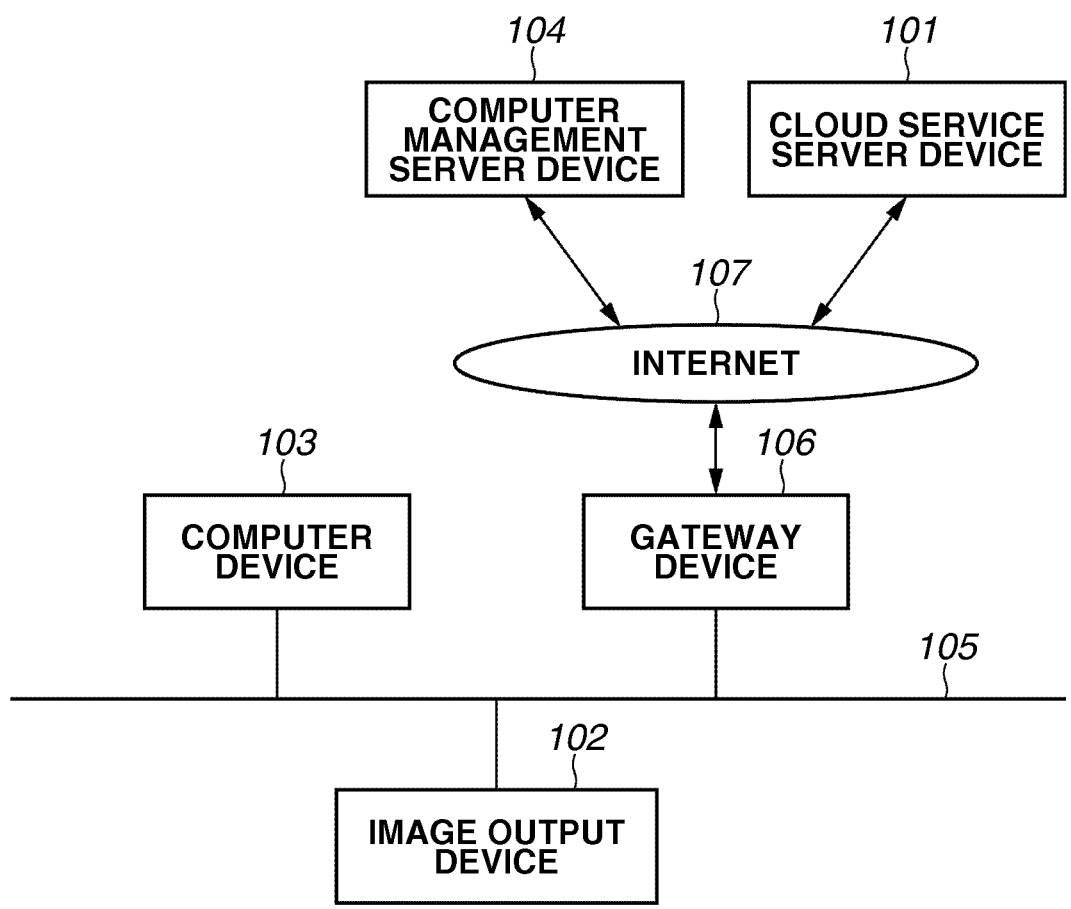
FIG. 1 illustrates an example system configuration of an exemplary embodiment of the present invention.

FIG. 1 illustrates an example system configuration of an embodiment of the present invention. An information processing system may include an image output device 102, a computer device 103, and a computer management server device 104.

The computer device 103 is an information processing apparatus operated by a user. The computer device 103 outputs a printing instruction to the image output device 102 via a network 105, to input a print job included in the printing instruction to the image output device 102. Accordingly, the computer device 103 causes the image output device 102 to execute the print job.

The computer device 103 outputs the printing instruction to a cloud service server device 101 via the Internet 107, and can also input the print job to the image output device 102 via the cloud service server device 101.

The image output device 102 receives the input of the print job from an external device (the computer device 103 or the cloud service server device 101), and performs the print job. The computer device 103 and the image output device 102 can communicate with each other via the network 105. The network 105 may be an Ethernet, for example.

The computer management server device 104 manages the computer device 103. The computer management server device 104 comprehends information representing a state of an operating system (OS) used by the computer device 103, and a use condition of a device such as the image output device 102, for example, and performs control to optimize the state of the OS and the use condition of the device. In other words, the computer management server device 104 functions as a management device configured to manage device management information. The device management information is information regarding a state of the computer device 103. The device management information includes information regarding the OS of the computer device 103, an application installed in the computer device 103, and a printer driver, for example. The device management information includes at least information regarding an output destination of the printing instruction issued by the computer device 103.

The cloud service server device 101 is a server device configured to generate a print job according to the printing instruction received from the computer device 103, and to input the print job to the image output device 102. The computer management server device 104 and the cloud service server device 101 are provided on the Internet 107.

A gateway device 106 is provided between the Internet 107 and the network 105. Therefore, the cloud service server device 101 and the computer management server device 104 cannot autonomously access the computer device 103 and the image output device 102 on the network 105. The computer management server device 104 receives an acquisition request of management information from the computer device 103, and returns the information as a response to the request. The cloud service server device 101 receives an acquisition request of the print job from the image output device 102, for example, and returns the print job as a response to the request.

Figure 2:
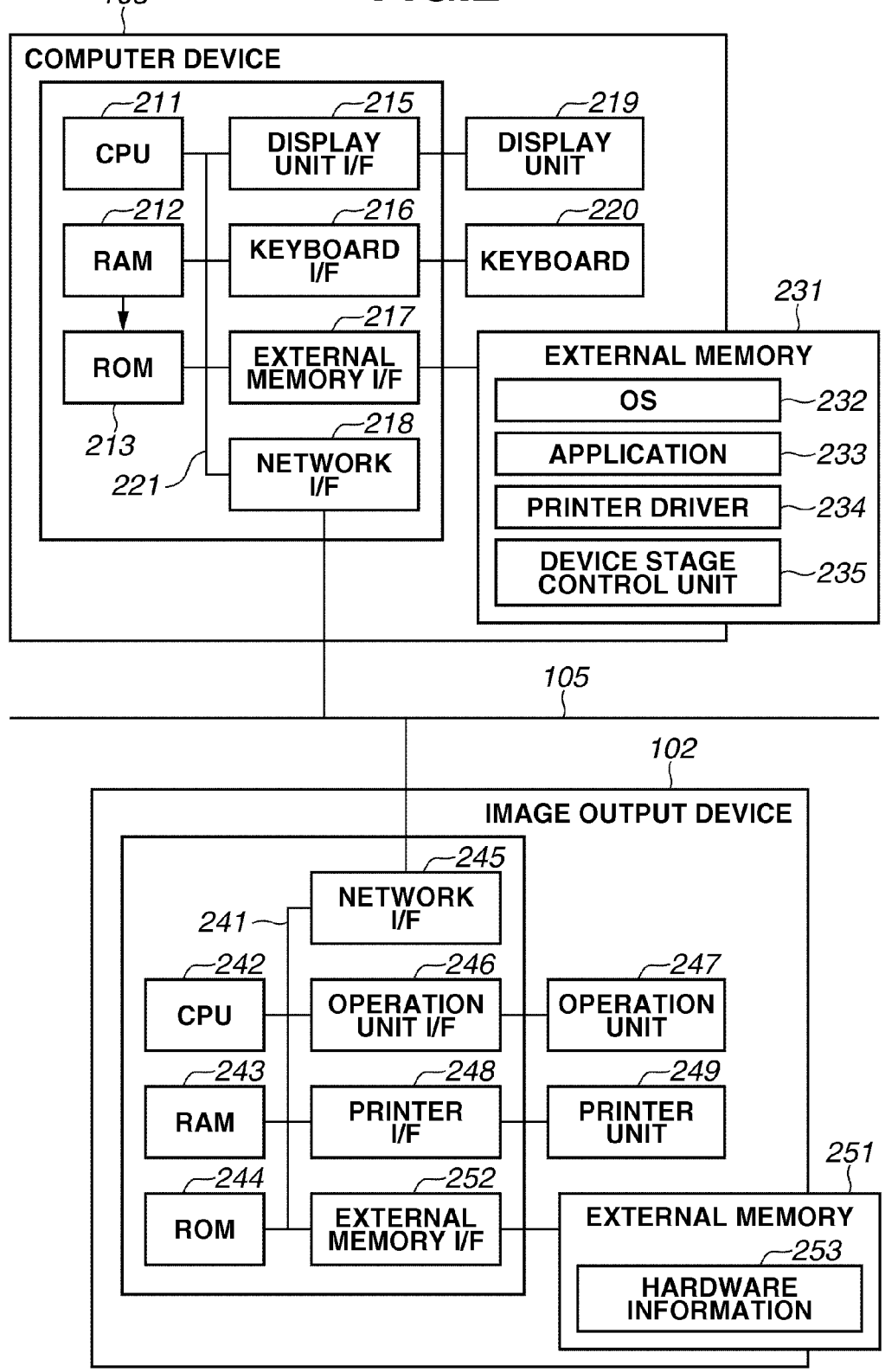
FIG. 2 illustrates example configurations of a computer device and an image output device.

FIG. 2 illustrates example configurations of the computer device and the image output device illustrated in FIG. 1. The computer device 103 includes a central processing unit (CPU) 211, a random access memory (RAM) 212, a read only memory (ROM) 213, a display unit interface (I/F) 215, a keyboard I/F 216, and an external memory I/F 217. The computer device 103 further includes a network I/F 218, a display unit 219, a keyboard 220, and an external memory 231.

The CPU 211 collectively controls each device connected to a system bus 221 according to a control program stored in the RAM 212. The CPU 211 controls the devices to realize a control method of the information processing apparatus according to the present exemplary embodiment. The above-described control program is a computer program configured to cause a computer to execute the control method according to the present exemplary embodiment. The RAM 212 also functions as a main memory, a working area, and the like for the CPU 211.

The ROM 213 stores various programs and data pieces. The display unit I/F 215 controls display processing in the display unit 219. The keyboard I/F 216 controls an input from the keyboard 220 or a pointing device (a mouse, a trackball, a joystick, a tablet, a pad, tracking device, touch panel or other spatial input devices), which is not illustrated.

The external memory I/F 217 controls an access to the external memory 231, such as a flash memory or a solid state drive (SSD). The external memory 231 functions as a storage medium which is storable or readable by the computer device 103. More specifically, the external memory 231 stores an OS 232, various applications 233, a printer driver 234, and a device stage control unit 235. The device stage control unit 235 receives distribution of device management information to be updated from the computer management server device 104, and executes processing according to the device management information to be updated.

The network I/F 218 is a network control unit. More specifically, the network I/F 218 enables the connection to the network 105 via a network terminal.

The image output device 102 includes a CPU 242, a RAM 243, a ROM 244, a network I/F 245, an operation unit I/F 246, a printer I/F 248, an external memory I/F 252, an operation unit 247, a printer unit 249, and an external memory 251.

The CPU 242 controls the entire operation of the image output device 102. More specifically, the CPU 242 collectively controls each device connected to a system bus 241. The RAM 243 functions as a main memory, a working area, and the like for the CPU 242. The RAM 243 is also used as an image information expansion area and an environment data storage area. The RAM 243 also includes a non-volatile random access memory (NVRAM) area. The RAM 243 is configured so that a memory capacity thereof can be extended by an option RAM to be connected to an expansion port (not illustrated).

The CPU 242 can communicate with the computer device 103 via the network I/F 245. For example, the CPU 242 receives a printing instruction including a print job from the computer device 103. The CPU 242 can notify the computer device 103 via the network 105 of information in the image output device 102 or the like. The CPU 242 can also receive a print job from the cloud service server device 101 via the network I/F 245 and the Internet 107.

According to the present exemplary embodiment, the network I/F 245 mounts a service protocol thereon. The network I/F 245 mounts a plurality of protocols for receiving the print job. For example, the network I/F 245 mounts a line printer daemon protocol (not illustrated) and Port 9100, which are capable of receiving the print job in a local network, thereon. For example, the network I/F 245 further mounts an Internet printing protocol (IPP) suitable for receiving the print job via the Internet thereon.

The CPU 242 transmits image data to the printer unit 249 via the printer I/F 248 based on a control program or the like stored in the ROM 244, and executes printing processing.

The ROM 244 stores various data pieces, such as various fonts and the control programs executed by the CPU 242. The network I/F 245 transmits and receives data to and from the computer device 103. The printer I/F 248 controls an interface with the printer unit 249 which is a printer engine.

The external memory I/F 252 controls an access to the external memory 251. The external memory 251 includes a flash memory, an SSD, or the like to store hardware information 253. When the external memory 251 such as a hard disk is not connected to the image output device 102, the ROM 244 may store information or the like to be utilized by the computer device 103.

The operation unit I/F 246 controls an interface with the operation unit 247 configured to set processing (for example, scanning processing) executed by the image output device 102. The operation unit 247 includes an operation panel capable of receiving user operations. The operation panel includes a switch for operation, a light emitting diode (LED) display device, and the like. Print setting information input from the operation panel may be stored in a NVRAM (not illustrated).

Figure 3:
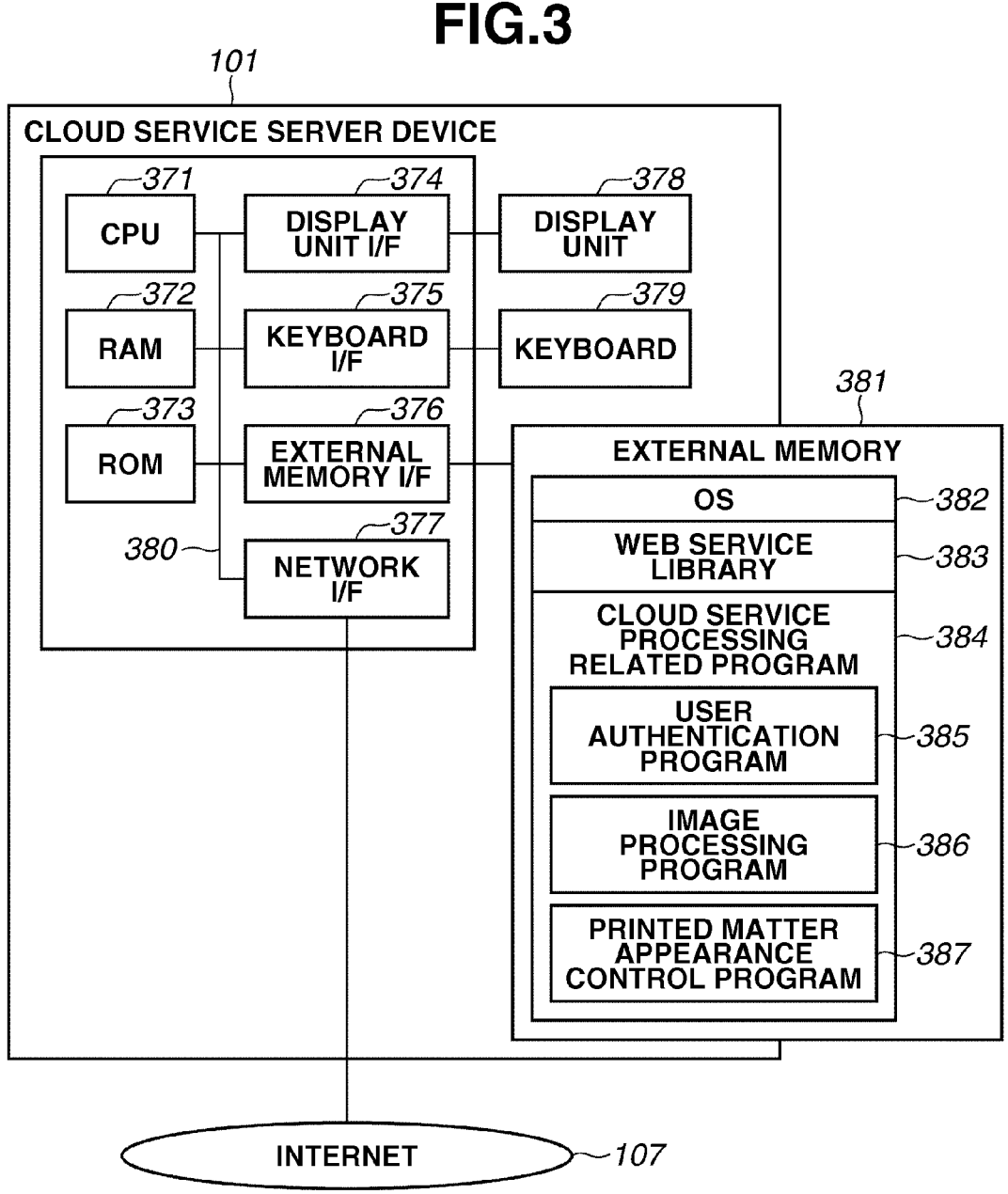
FIG. 3 illustrates an example configuration of a cloud service server device.

FIG. 3 illustrates an example configuration of the cloud service server device. The cloud service server device 101 includes a CPU 371, a RAM 372, a ROM 373, a display unit I/F 374, a keyboard I/F 375, and an external memory I/F 376. The cloud service server device 101 further includes a network I/F 377, a display unit 378, a keyboard 379, and an external memory 381.

The CPU 371 collectively controls each device connected to a system bus 380 according to a program stored in the RAM 372. The RAM 372 also functions as a main memory, a working area, and the like for the CPU 371.

The ROM 373 stores various programs and data pieces. The keyboard I/F 375 controls an input from the keyboard 379 or a pointing device (for example, a mouse), which is not illustrated. The display unit I/F 374 controls display processing in the display unit 378.

The external memory I/F 376 controls an access to the external memory 381 such as a hard disk (IID) or an SSD. The external memory 381 stores an OS 382, a web service library 383, and various cloud service processing related programs 384. The cloud service processing related programs 384 includes a user authentication program 385, an image processing program 386, a printed matter appearance control program 387, and a rendering program 388, for example. The network I/F 377 is connected to the computer device 103 via the Internet 107. Thus, the network I/F 377 can transfer data (for example, inputting of the print job).

Figure 4:
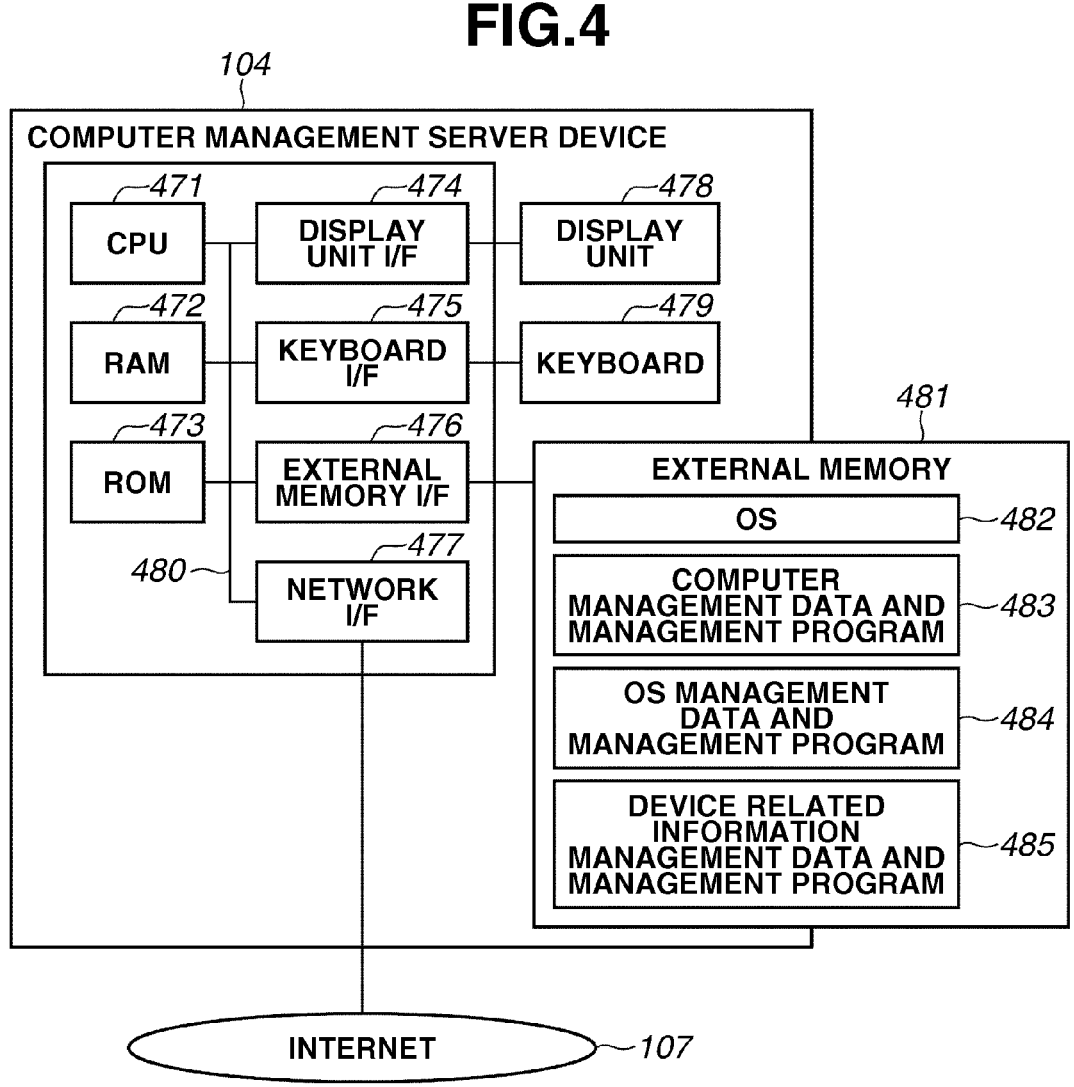
FIG. 4 illustrates an example configuration of a computer management server device.

FIG. 4 illustrates an example configuration of the computer management server device 104. The computer management server device 104 includes a CPU 471, a RAM 472, a ROM 473, a display unit I/F 474, a keyboard I/F 475, and an external memory I/F 476. The computer management server device 104 further includes a network I/F 477, a display unit 478, a keyboard 479, and an external memory 481.

The CPU 471 collectively controls each device connected to a system bus 480 according to a program stored in the RAM 472. The RAM 472 also functions as a main memory, a working area, and the like for the CPU 471. The ROM 473 stores various programs and data pieces. The keyboard I/F 475 controls an input from the keyboard 479 or a pointing device (for example, a mouse, a trackball, a joystick, a tablet, a pad, tracking device, touch panel or other spatial input devices), which is not illustrated. The display unit I/F 474 controls display processing in the display unit 478.

The external memory I/F 476 controls an access to the external memory 481 such as an HD or an SSD. The external memory 481 stores an OS 482, a computer management data and management program 483, an OS management data and management program 484, and a device related information management data and management program 485.

The computer management data and management program 483 manages device management information corresponding to the computer device 103. For example, the computer management data and management program 483 manages a license state and an update state of the OS used in the computer device 103. The OS management data and management program 484 manages the latest information of the OS. The device related information management data and management program 485 manages information related to the devices such as the image output device.

The network I/F 477 is connected to the computer device 103 via the Internet 107. The network I/F 477 performs communication control processing between the network I/F 477 and the image output device 102 via the Internet 107 and the network 105. The latest information is registered into the computer management server device 104, and thereby, the state of the computer device 103 can be monitored, and distribution of information and a program can be performed if needed.

Figure 5:
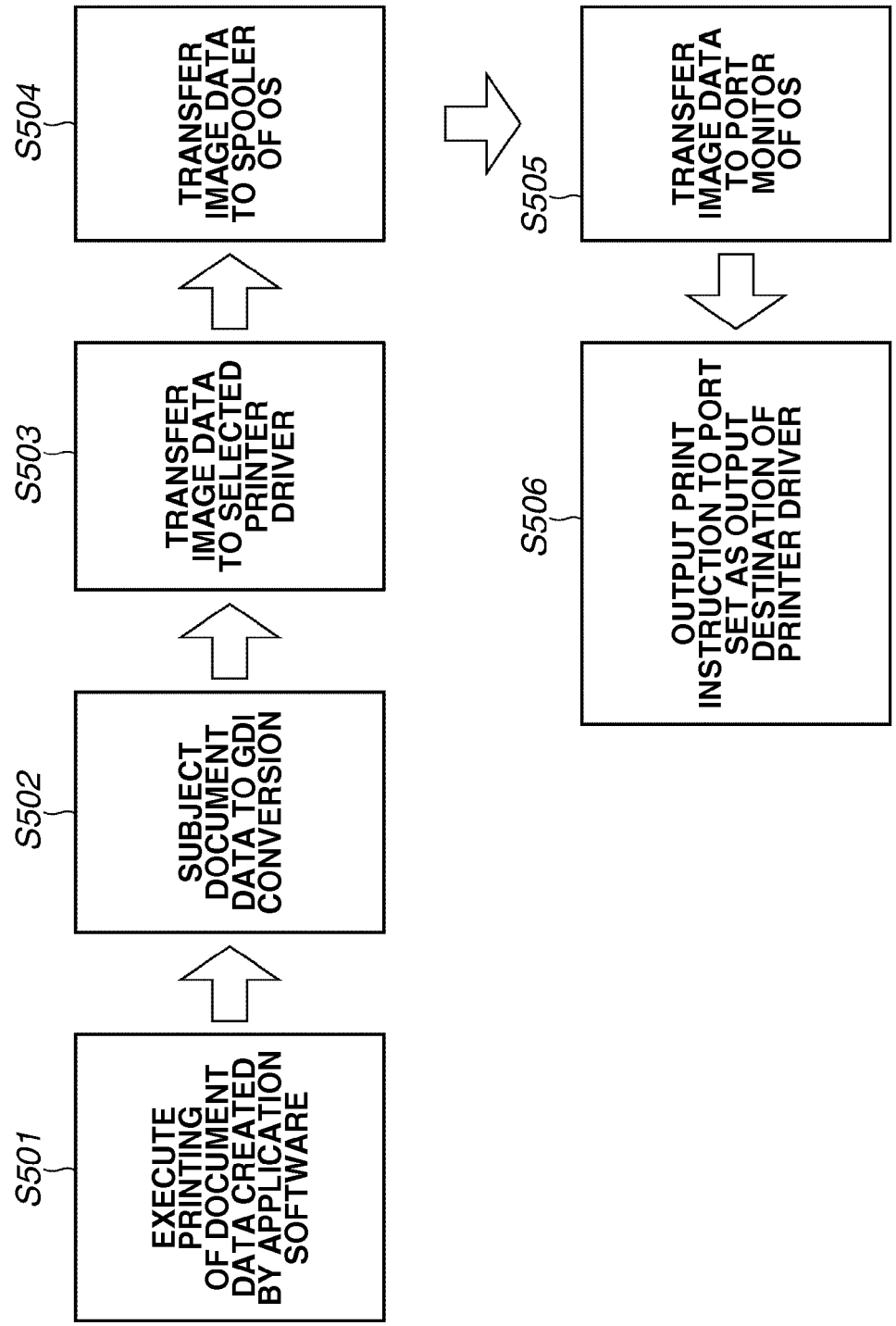
FIG. 5 illustrates output processing of a printing instruction to the image output device.

FIG. 5 illustrates output processing of a printing instruction to the image output device from the computer device. For example, it may be assumed that the OS included in the computer device 103 is the Windows® OS manufactured by Microsoft® Co., Ltd. Application software and a device driver for the device such as the image output device to be used can be registered on the OS.

First, in step S501, printing of document data created by the application software registered on the OS is instructed. Then, in step S502, the OS receives the document data from the application software. The OS converts the document data into image data in a format compatible with the printer driver 234 (for example, image data in a common format such as Graphic Device Interface (GDI)). In step S503, the OS transfers the converted image data to the selected printer driver 234.

Next, in step S504, the printer driver 234 converts the image data received from the OS into an optimum format for the image output device, and inputs the image data to a spooler of the OS. In step S505, the image data input to the spooler is delivered to a port monitor. The port monitor is a program for managing an output destination of information. In step S506, the port monitor outputs a printing instruction for instructing the printing of the image data to the output destination (port) set for each printer driver. The port monitor can select a printer port for file output or a line printer (LPT), and an LPR and Port 9100 using a transmission control protocol (TCP)/Internet protocol (IP) protocol.

Figure 6:
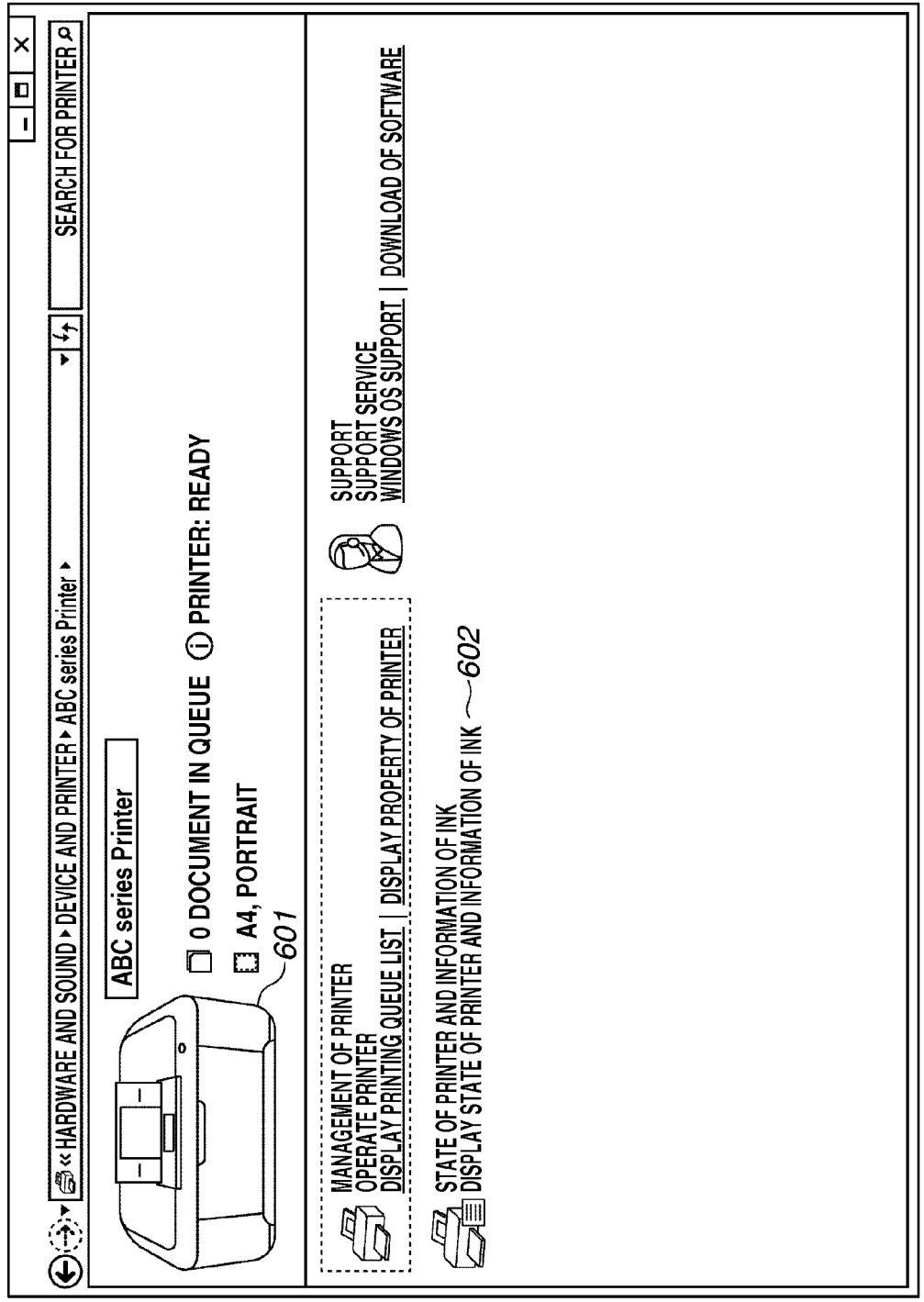
FIG. 6 illustrates an example device stage user interface (UI).

FIG. 6 illustrates an example device stage user interface (UI). The device stage UI is an operation screen which enables a user to perform a setting operation regarding the image output device 102 connected to the computer device 103 via the network 105. The OS included in the computer device 103 includes a function of a device stage. The device stage is a function of managing the device registered in the computer device 103 by allocating related information and a program thereto.

When the OS detects connection of the image output device 102 which is not registered in the OS, a printer driver previously prepared in the OS, and a printer driver distributed from the computer management server device 104 are installed. The computer device 103 may install a printer driver set provided by a manufacturer of the image output device 102. When the user of the computer device 103 selects the printer driver corresponding to the image output device for performing printing processing, the device stage control unit 235 (FIG. 2) displays the device stage UI.

The selected printer driver includes reference destination information such as a detailed bit map or manual of the image output device 102 corresponding to the printer driver, and related information such as a utility software for monitoring a state. The device stage control unit 235 arranges the above-described related information pieces on the device stage UI.

FIG. 6 illustrates a display example 601 of the detailed bit map of the image output device 102. FIG. 6 also illustrates a display example 602 of utility software and a reference destination of the image output device 102. These related information pieces may be included in the printer driver, or distributed by the computer management server device 104. When the latest related information is prepared in the computer management server device 104, the already introduced related information can be updated. The deletion of the already introduced related information can also be instructed.

Figure 7A:
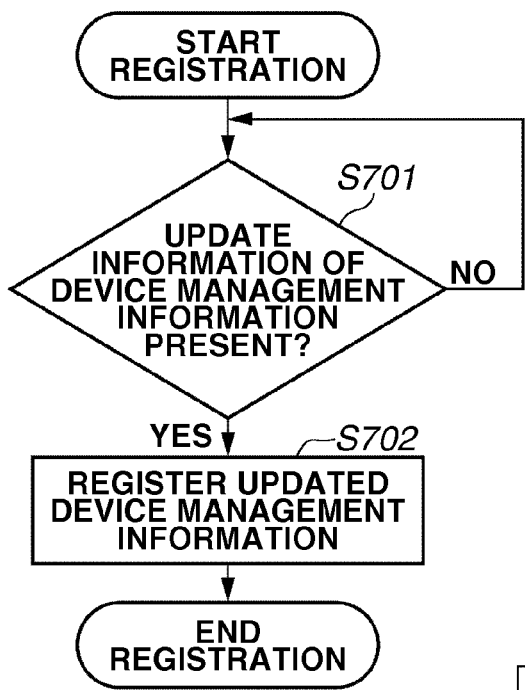
FIGS. 7A and 7B illustrate an example of registration processing of device management information to the computer management server device and an example of distribution processing of update information to the computer device, respectively.
Figure 7B:
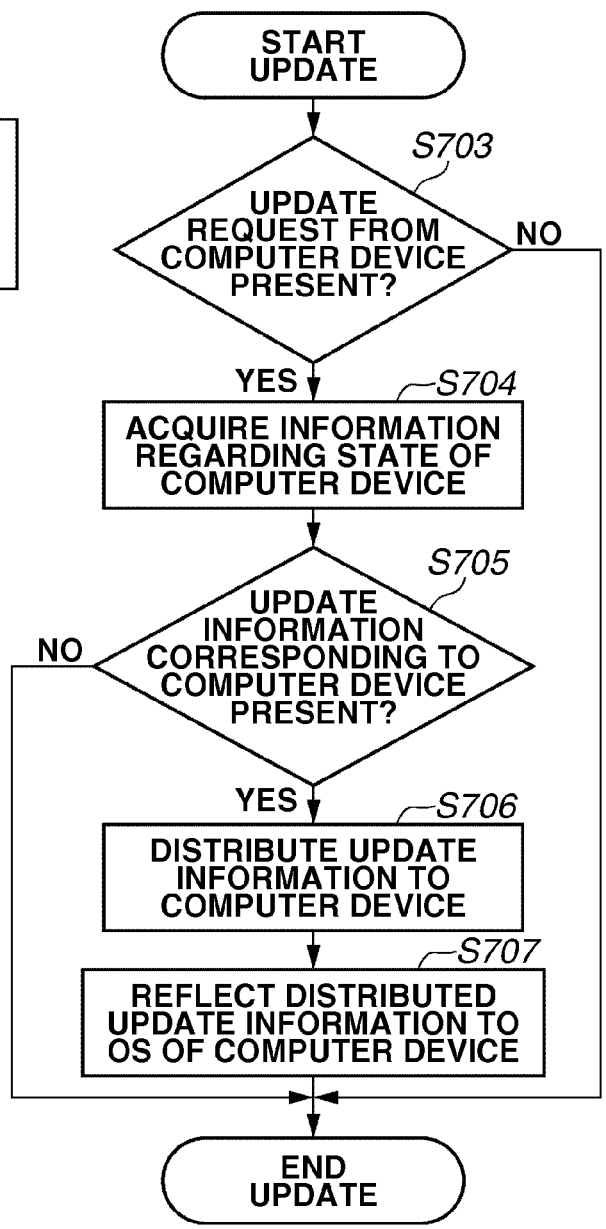

FIGS. 7A and 7B illustrate an example of registration processing of the device management information to the computer management server device, and an example of distribution processing of update information to the computer device, respectively. First, the registration processing of the device management information to the computer management server device will be schematically described. The latest device management information is registered in the computer management server device 104. Then, for example, the computer device 103 using the Windows® OS makes an update request to the computer management server device 104 managed by Microsoft® Co., Ltd. The update request is a request for acquiring the update information, i.e., a request for the transmission of the update information. The update information is the device management information to be updated.

The computer management server device 104 compares the information regarding the state of the computer device 103 with the device management information corresponding to the computer device 103 managed on the computer management server device 104. The information regarding the state of the computer device 103 is the information regarding the OS, the application, and the printer driver 234 of the computer device 103, for example.

The computer management server device 104 distributes a difference between the information regarding the state of the computer device 103 and the device management information managed on the computer management server device 104 to the computer device 103 as the update information. When the computer management server device 104 manages the related information corresponding to the printer driver installed in the computer device 103 as a part of the device management information, the related information is also distributed to the computer device 103 as the update information.

FIG. 7A is a flow chart illustrating an example of the registration processing of the update information to the computer management server device. First, in step S701, the CPU 471 of the computer management server device 104 determines whether the device management information of the computer device 103 is updated, for example, based on a user operation input of the computer management server device 104.

When the CPU 471 determines that the device management information is not updated (NO in step S701), the processing returns to step S701. When the CPU 471 determines that the device management information is updated (YES in step S701), the processing proceeds to step S702. In step S702, the CPU 471 registers the updated device management information, and ends the processing. For example, when the cloud service server device 101, which is an output target of the printing instruction by the computer device 103, newly appears, the computer management server device 104 executes processing described with reference to FIG. 7A, and registers cloud service information. The cloud service information is information regarding the cloud service server device 101.

The computer management server device 104 may execute the following processing to automatically register the cloud service information into the computer management server device 104. For example, the computer device 103 makes a search request requiring a search of the cloud service server device 101, which can input the print job to the image output device 102 performing printing, to the computer management server device 104. The computer management server device 104 searches for the cloud service server device 101 on the Internet 107 according to the search request. The computer management server device 104 registers the cloud service information corresponding to the searched cloud service server device 101.

FIG. 7B is a flow chart illustrating an example of the distribution processing of the update information to the computer device. First, the CPU 211 of the computer device 103 functions as a request unit configured to make an update request to the computer management server device 104 via the network 105 and the Internet 107.

In step S703, the CPU 471 of the computer management server device 104 determines whether the update request from the computer device 103 is present. When the CPU 471 determines that the update request from the computer device 103 is not present (NO in step S703), the CPU 471 ends the processing. When the CPU 471 determines that the update request from the computer device 103 is present (YES in step S703), the processing proceeds to step S704.

Next, in step S704, the CPU 471 acquires the information regarding the state of the computer device 103 from the computer device 103. In step S705, the CPU 471 determines whether update information corresponding to the computer device 103 is present. More specifically, the CPU 471 determines whether there is a difference between the latest device management information of the computer device 103 registered by the computer management server device 104 and the information regarding the state of the computer device 103 acquired in step S704.

When there is a difference between the latest device management information of the computer device 103 registered by the computer management server device 104 and the information regarding the state of the computer device 103, the CPU 471 determines that update information corresponding to the computer device 103 is present. When there is no difference between the latest device management information of the computer device 103 registered by the computer management server device 104 and the information regarding the state of the computer device 103, the CPU 471 determines that update information corresponding to the computer device 103 is not present.

When the CPU 471 determines that update information corresponding to the computer device 103 is not present (NO in step S705), the CPU 471 ends the processing. When the CPU 471 determines that update information corresponding to the computer device 103 is present (YES in step S705), the processing proceeds to step S706.

Next, in step S706, the CPU 471 distributes the difference between the latest device management information of the computer device 103 and the information regarding the state of the computer device 103 to the computer device 103 as the update information. In step S707, the CPU 211 of the computer device 103 reflects the distributed update information to the information regarding the state of the computer device 103. For example, when the update information includes the information regarding the OS, the CPU 211 reflects the information regarding the OS to the OS. Accordingly, the information regarding the OS included in the CPU 211 is updated.

Figure 8:
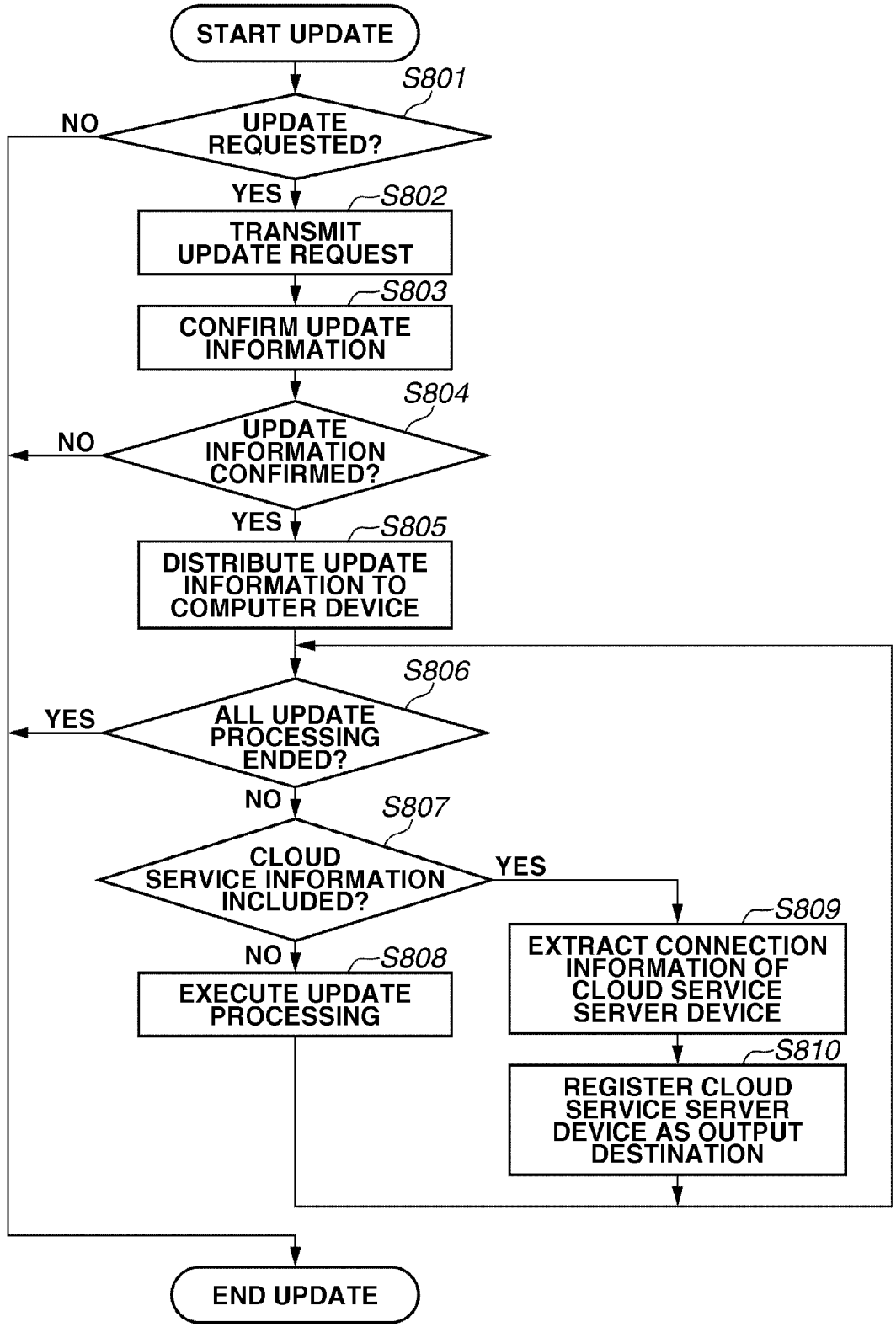
FIG. 8 is a flow chart illustrating a detailed example of the distribution processing of the update information to the computer device.

FIG. 8 is a flow chart illustrating a detailed example of the distribution processing of the update information to the computer device. In step S801, the CPU 211 of the computer device 103 determines whether the update request is made based on a user operation input. In step S801, when the user clicks a right mouse button on the device stage UI, for example, to select processing of "update to the latest information" (the illustration is omitted), the CPU 211 determines that the update request is made (YES in step S801).

For example, when the update of the OS is instructed by a "Windows® Update" function, the CPU 211 may determine that the update request is made. When the computer device 103 introduces the printer driver, or when the printer driver is updated, the CPU 211 may determine that the update request is made.

Next, in step S802, the CPU 211 transmits the update request to the computer management server device 104. In step S803, the CPU 471 of the computer management server device 104 compares the information regarding the state of the computer device 103 with device information, to confirm whether the update information is present.

In step S804, the CPU 471 determines whether the presence of the update information is confirmed. When the presence of the update information is not confirmed (NO in step S804), CPU 471 ends the processing. When the presence of the update information is confirmed (YES in step S804), the processing proceeds to step S805.

Next, in step S805, the CPU 471 distributes the update information to the computer device 103 as a response to the update request. The CPU 211 of the computer device 103 functions as an information acquisition unit for acquiring the update information distributed from the computer management server device 104. In step S805, the CPU 211 delivers the update information to the device stage control unit 235.

Next, in step S806, the CPU 211 of the computer device 103 determines whether all update processes based on the update request are completed. When all the update processes based on the update request are completed (YES in step S806), the CPU 211 ends the processing. If any update processing based on the update request remains (NO in step S806), the processing proceeds to step S807.

Next, in step S807, the device stage control unit 235 functions as a determination unit for determining whether the update information includes the cloud service information. When the update information does not include the cloud service information (NO in step S807), the processing proceeds to step S808. In step S808, the device stage control unit 235 executes the update processing of the information indicating the state of the computer device 103 using the update information, and the processing returns to step S806.

In step S808, for example, the device stage control unit 235 reflects the information regarding the OS included in the update information to the OS 232. For example, the device stage control unit 235 reflects information regarding the application included in the update information to the application 233. For example, the device stage control unit 235 reflects the information regarding the printer driver included in the update information to the printer driver 234.

When the update information includes the cloud service information (YES in step S807), the device stage control unit 235 acquires the cloud service information from the update information. In step S809, the device stage control unit 235 extracts connection information about the cloud service server device 101 included in the cloud service information.

The connection information includes a type of an output port of the computer device 103 corresponding to the cloud service server device 101, and a transfer method of information to the cloud service server device 101. The connection information further includes address information of the cloud service server device 101, or the like. The connection information further includes identification (ID)/password authentication information, i.e., information indicating whether the cloud service server device 101 performs authentication processing based on a user ID and a password when the computer device 103 accesses the cloud service server device 101. The user ID and the password are authentication information required for performing the authentication processing.

The device stage control unit 235 delivers the extracted connection information to the port monitor. In step S810, the port monitor functions as an output destination registration unit for registering the cloud service server device 101 as the output destination of the printing instruction based on the delivered connection information. Then, the processing returns to step S806.

After the device stage control unit 235 extracts the connection information in step S809, the device stage control unit 235 may display a port monitor registration state screen, for example as illustrated in FIG. 9D. The device stage control unit 235 may deliver the connection information to the port monitor according to a user operation input on the port monitor registration state screen, and register the cloud service server device 101 as the output destination of the printing instruction. The port monitor registers the delivered connection information in association with the cloud service server device 101.

Figure 10:
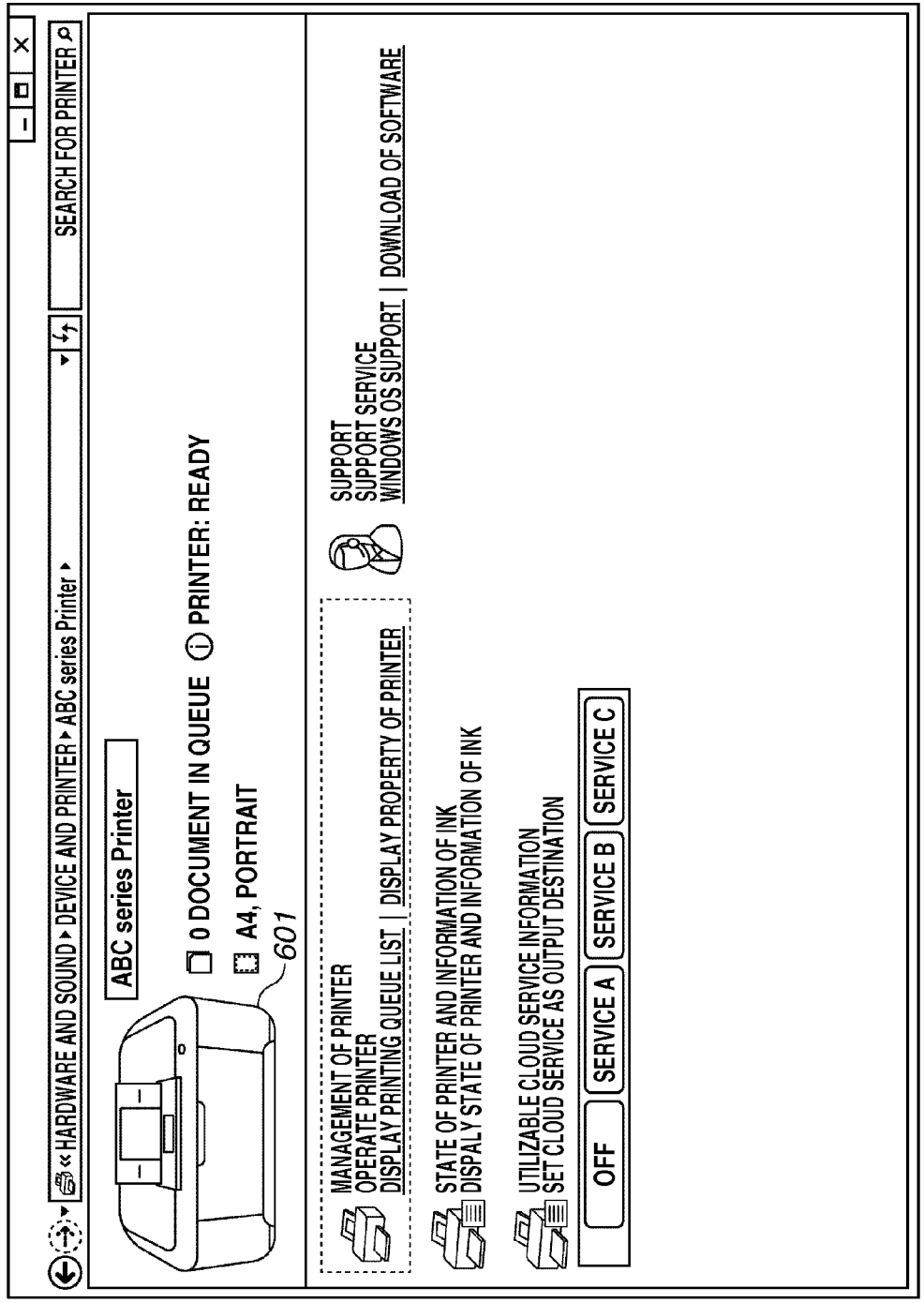
FIG. 10 illustrates another example of a device stage UI.

After the device stage control unit 235 extracts the connection information, the device stage control unit 235 may display the device stage UI illustrated in FIG. 10. In other words, the device stage control unit 235 functions as a first display unit for selectably displaying the cloud service server device 101 on the screen based on the connection information. The device stage control unit 235 may deliver the connection information to the port monitor according to a user selection input using the device stage UI, and register the cloud service server device 101 as the output destination of the printing instruction.

When the connection information includes the ID/password authentication information, the device stage control unit 235 may deliver the ID/password authentication information to the port monitor, and register the ID/password authentication information in association with the cloud service server device 101. The device stage control unit 235 may display a setting screen of account information as illustrated in FIG. 11, to prompt the user to input the user ID and the password.

FIGS. 9A to 9D illustrate examples of the cloud service information pieces and the port monitor registration state screen. FIGS. 9A, 9B, and 9C illustrate the cloud service information pieces respectively corresponding to the cloud service server devices A, B, and C.

Each of the cloud service information pieces illustrated in FIGS. 9A to 9C include a port type, a name, a function name, ID/password authentication, a transfer method, and an address. The port type is a type of the output port corresponding to the cloud service server device 101. The name is a name of the cloud service server device 101. The ID/password authentication represents the ID/password authentication information.

The ID/password authentication information is information indicating whether the cloud service server device 101 performs the authentication processing when the computer device 103 accesses the cloud service server device 101. The setting of ON to the ID/password authentication indicates that the cloud service server device 101 performs the authentication processing when the computer device 103 accesses the cloud service server device 101. The setting of OFF to the ID/password authentication indicates that the cloud service server device 101 does not perform the authentication processing when the computer device 103 accesses the cloud service server device 101.

FIG. 9D illustrates an example port monitor registration state screen. In FIG. 9D, a standard TCP/IP port is selected as the output destination of the printing instruction, i.e., the output destination of the printer driver. In addition, clouds A and B are newly registered as the output destination of the printing instruction. Each of the clouds A and B is a cloud service server device 101 corresponding to cloud information acquired by the device stage control unit 235 from the update information. When the user selects the clouds A and B on the port monitor registration state screen and clicks an OK button, the port monitor sets the clouds A and B to the output destination of the present printing instruction.

FIG. 10 illustrates an example device stage UI for setting the cloud service server device as the output destination. Each of services A, B, and C indicates the cloud service server device 101 which is a target of the output destination of the printing instruction. When the user clicks a button described as the service A, for example, the cloud service server device 101 corresponding to the service A is selected. Then the port monitor sets the selected cloud service server device 101 as the output destination of the printing instruction.

FIG. 11 illustrates an example setting screen of the account information. When the user enters an account name (user ID) and a password on the setting screen of the account information, and clicks an OK button, the port monitor sets the entered ID and password. The CPU 211 includes the set ID and password in the printing instruction to be transmitted to the cloud service server device 101.

Figure 12:
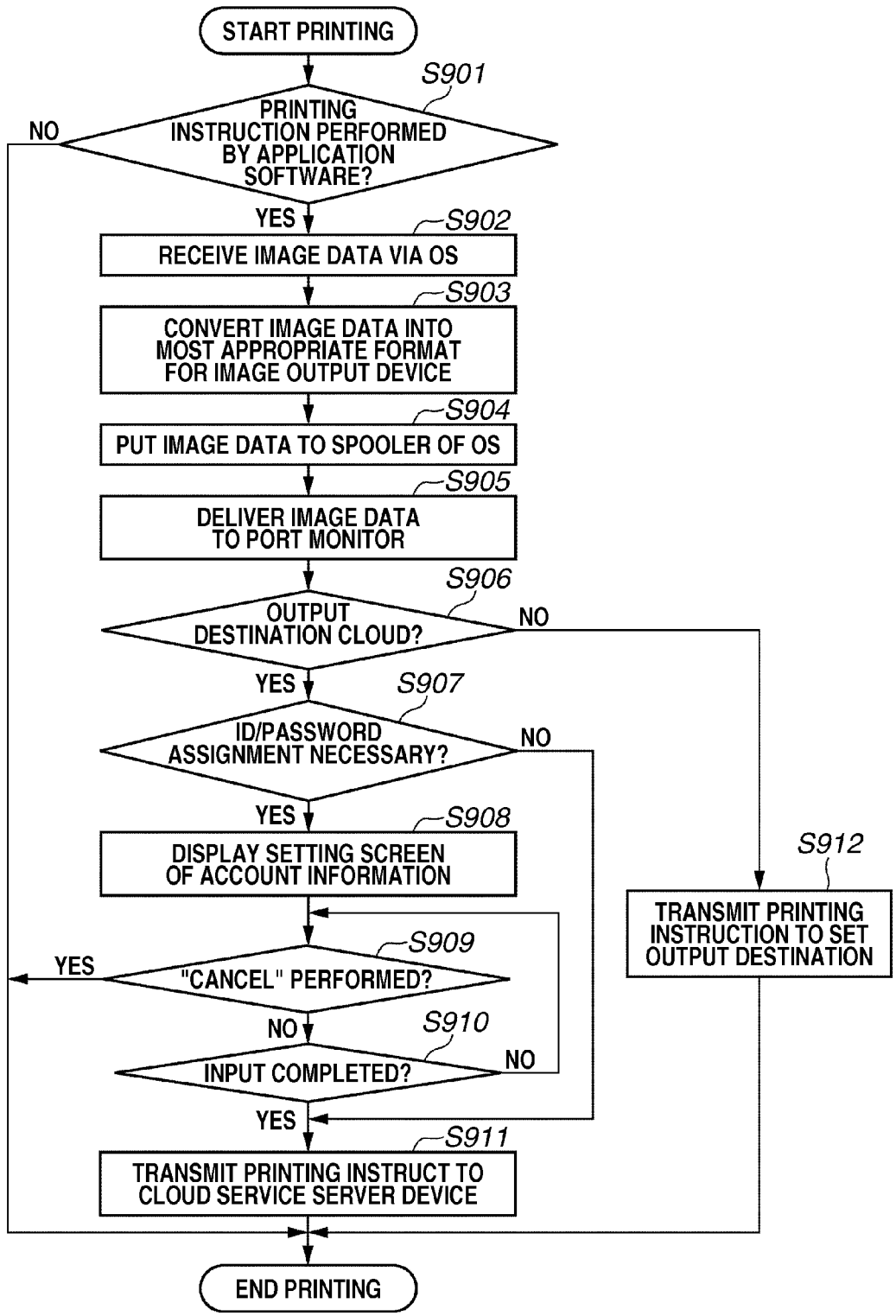
FIG. 12 is a flow chart illustrating output processing of a printing instruction to the cloud service server device.

FIG. 12 is a flow chart illustrating the output processing of the printing instruction to the cloud service server device from the computer device. First, the application software registered on the OS 232 of the computer device 103 generates document data. In step S901, the OS 232 determines whether the application software instructs printing of the document data. When the application software does not instruct the printing of the document data (NO in step S901), the OS 232 ends the processing. When the application software instructs the printing of the document data (YES in step S901), the processing proceeds to step S902.

In step S902, the OS 232 receives the document data from the application software. In step S903, the OS converts the document data into image data in a format compatible with the printer driver 234, and transfers the image data to the printer driver 234.

Next, in step S904, the printer driver 234 converts the image data received from the OS 232 into the optimum format for the image output device 102, and inputs the image data to the spooler of the OS 232. Then, in step S905, the spooler delivers the input image data to the port monitor.

Next, in step S906, the port monitor determines whether the output destination of the printing instruction set at present is the cloud service server device 101. When the output destination of the printing instruction set at present is not the cloud service server device 101 (NO in step S906), the processing proceeds to step S912. In step S912, the port monitor transmits the printing instruction for instructing the printing of the image data to the output destination of the printing instruction.

When the output destination of the printing instruction set at present is the cloud service server device 101 (YES in step S906), the processing proceeds to step S907. In step S907, the port monitor determines whether assignment of ID/password is necessary. When the ID/password authentication information is not registered in association with the cloud service server device 101, the port monitor determines that the assignment of the ID/password is not necessary (NO in step S907), and the processing proceeds to step S911. When the ID/password authentication information is registered in association with the cloud service server device 101, the port monitor determines that the assignment of the ID/password is necessary (YES in step S907), and the processing proceeds to step S908.

Next, in step S908, the device stage control unit 235 displays the setting screen of the account information illustrated in FIG. 11, for example, to prompt the user to input the ID and the password. In other words, the device stage control unit 235 functions as a second display unit for displaying a screen for prompting the input of the authentication information required for the authentication processing by the cloud service server device 101 when the computer device 103 issues the printing instruction to the cloud service server device 101.

Next, in step S909, the port monitor determines whether the input of the ID and the password is canceled. When the input of the ID and the password is canceled (YES in step S909), the port monitor ends the processing. When the input of the ID and the password is not canceled (NO in step S909), then in step S910, the port monitor determines whether the input of the ID and the password is completed.

When the input of the ID and the password is not completed (NO in step S910), the processing returns to step S909. When the input of the ID and the password is completed (YES in step S910), the processing proceeds to step S911. In step S911, the port monitor transmits the printing instruction including the entered ID and password and the image data to the cloud service server device 101.

The above-described computer device 103 can receive the distribution of the cloud service information, and can automatically register the cloud service server device 101 corresponding to the cloud service information as the output destination of the printing instruction. Therefore, for example, when the cloud service server device 101 which can be utilized by the computer device 103 is changed, the changed cloud service server device 101 can be automatically registered as the output destination of the printing instruction.

Aspects of the present invention can also be realized by a computer of a system or apparatus (or devices such as a CPU or a MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-159467 filed Jul. 21, 2011, which is hereby incorporated by reference in its entirety.

What is claimed is:

1. An information processing apparatus configured to issue a printing instruction via a network to cause an image output device to execute a print job, the information processing apparatus comprising:
   a request unit configured to make an acquisition request of device management information to be updated corresponding to the information processing apparatus, to a management device configured to manage the device management information including at least information regarding an output destination of the printing instruction issued by the information processing apparatus;
   an information acquisition unit configured to acquire the device management information to be updated from the management device according to the acquisition request;
   a determination unit configured to determine whether the device management information to be updated includes information regarding a server device configured to generate a print job according to the printing instruction from the information processing apparatus to input the print job to the image output device;
   an output destination registration unit configured to register the server device as the output destination of the printing instruction based on the information regarding the server device if the device management information to be updated is determined to include the information regarding the server device; and
   a first display unit configured to display a device-stage screen provided by a device management function of managing the image output device by allocating related information and a program to and/or for the image output device, the device management function being included in an operating system of the information processing apparatus,
   wherein a plurality of the server devices registered by the output destination registration unit is displayed on the device-stage screen as candidates of a server device to generate and input a print job to the image output device,
   wherein the plurality of the server devices comprises cloud service server devices, and the cloud service server devices being displayed on the device-stage screen are each located on a distinct cloud; and each of the displayed cloud service server devices are designated by a respective service button such that, when a service button is selected, the corresponding cloud service server device is selected as an output destination of the printing instruction, and
   wherein the device-stage screen further displays an "OFF" option operating to disable the selection of a cloud service server device as an output destination.

2. The information processing apparatus according to claim 1,
   wherein if one of the plurality of server devices displayed on the screen is selected, the output destination registration unit registers the selected server device as the output destination of the printing instruction.

3. The information processing apparatus according to claim 1, wherein the information regarding the server device further includes address information of the server device, and
   the output destination registration unit registers the address information of the server device in association with the server device.

4. The information processing apparatus according to claim 1,
   wherein the information regarding the server device further includes information indicating whether the server device performs authentication processing when the information processing apparatus accesses the server device,
   wherein the output destination registration unit also registers the information indicating whether the server device performs the authentication processing when the information processing apparatus accesses the server device, in association with the server device, and
   wherein the information processing apparatus further comprises a second display unit configured to display a screen for prompting an input of authentication information required for the authentication processing by the server device when the information processing apparatus issues the printing instruction to the server device.

5. The information processing apparatus according to claim 1, wherein the output destination registration unit is a port monitor.

6. A method for controlling an information processing apparatus configured to issue a printing instruction via a network to cause an image output device to execute a print job, the method comprising:
   making an acquisition request of device management information to be updated corresponding to the information processing apparatus, to a management device configured to manage the device management information including at least information regarding an output destination of the printing instruction issued by the information processing apparatus;
   acquiring the device management information to be updated from the management device according to the acquisition request;
   determining whether the device management information to be updated includes information regarding a server device configured to input the print job to the image output device according to the printing instruction from the information processing apparatus;

registering the server device as the output destination of the printing instruction based on the information regarding the server device if the device management information to be updated is determined to include the information regarding the server device; and displaying a device-stage screen provided by a device management function of managing the image output device by allocating related information and a program to and/or for the image output device, the device management function being included in an operating system of the information processing apparatus, wherein a plurality of the server devices registered by the output destination registration unit is displayed on the device-stage screen as candidates of a server device to generate and input a print job to the image output device, wherein the plurality of the server devices comprises cloud service server devices, and the cloud service server devices being displayed on the device-stage screen are each located on a distinct cloud; and each of the displayed cloud service server devices are designated by a respective service button such that, when a service button is selected, the corresponding cloud service server device is selected as an output destination of the printing instruction, and wherein the device-stage screen further displays an "OFF" option operating to disable the selection of a cloud service server device as an output destination.

7. A non transitory computer readable storage medium storing a computer program for causing a computer to execute the method according to claim 6.

8. The information processing apparatus according to claim 1, wherein at least one of:
  (i) the network including the information processing apparatus and image output device is different from the one or more networks including the plurality of the server devices;
  (ii) a gateway device is located between the network including the information processing apparatus and image output device and the plurality of the server devices; and
  (iii) the network including the information processing apparatus and image output device is different from a network including the management device.

9. The information processing apparatus according to claim 1, wherein at least one of: (i) each cloud service server device has a unique port designated in the information processing apparatus and the information processing apparatus uses the designated port to transfer information and/or the print job to the corresponding cloud service server device; (ii) each cloud service server device operates to provide one or more cloud services; (iii) each cloud service server device operates to generate or update image data according to the printing instructions and cause the image output device to execute the print job; and (iv) image data is transferred to a selected driver associated with the image output device.

10. The information processing apparatus according to claim 1, wherein at least one of: (i) the determination unit further operates to determine whether the update includes cloud service information, and, if yes, then the cloud service information is extracted from the update and one or more cloud service devices identified in the cloud service information are designated and/or registered as one or more output destinations and/or as the candidates; and (ii) the cloud service information includes at least connection information of one or more cloud service devices of the plurality of the cloud service devices.

11. The information processing apparatus according to claim 1, wherein each cloud service server device operates to generate image data according to the printing instructions and the image output device further operates to: (i) access at least one of the cloud service server devices to acquire the image data for the printing instructions from the cloud service server device; and (ii) generate and output the print job.

12. The information processing apparatus according to claim 1, wherein, when a cloud service server device is selected as the output destination of the printing instruction, a screen is displayed, the screen operating to request and receive an account name and a password, wherein, when the account name and the password are received, the received account name and password are transmitted to the selected cloud service server device along with the printing instruction.

13. The information processing apparatus according to claim 12, wherein, when the account name and the password are requested and not received or the request for the account name and the password is canceled, the printing instruction is not transmitted to the cloud service server device.

14. The information processing apparatus according to claim 1, wherein at least one of the cloud service server devices include at least one of: a processor, a display unit, at least one memory, a network interface, an operating system, a web service library, a cloud service processing related program, a user authentication program, an image processing program and a printed matter appearance control program.

15. The information processing apparatus according to claim 1, wherein at least one of: (i) the allocated, related information and/or the allocated program include a selected driver associated with the image output device; and (ii) image data related to the printing job is transferred to the selected driver associated with the image output device.

* * * * *